United States Patent
Luo et al.

(10) Patent No.: US 11,420,563 B2
(45) Date of Patent: Aug. 23, 2022

(54) RUNNING BOARDS AND VEHICLES

(71) Applicant: WINBO-DONGJIAN AUTOMOTIVE TECHNOLOGY CO., LTD., Foshan (CN)

(72) Inventors: Guodong Luo, Foshan (CN); Changbiao Chen, Foshan (CN); Jie Yang, Foshan (CN)

(73) Assignee: WINBO-DONGJIAN AUTOMOTIVE TECHNOLOGY CO., LTD., Foshan (CN)

( * ) Notice: Subject to any disclaimer, the term of this patent is extended or adjusted under 35 U.S.C. 154(b) by 125 days.

(21) Appl. No.: 16/930,610

(22) Filed: Jul. 16, 2020

(65) Prior Publication Data
US 2021/0309153 A1 Oct. 7, 2021

(51) Int. Cl.
*B60R 3/00* (2006.01)

(52) U.S. Cl.
CPC .................................. *B60R 3/002* (2013.01)

(58) Field of Classification Search
CPC ...................................................... B60R 3/002
See application file for complete search history.

(56) References Cited

U.S. PATENT DOCUMENTS

| 8,641,068 B1* | 2/2014 | Bundy | B60R 3/002 280/163 |
| 2019/0389386 A1* | 12/2019 | Meszaros | B60R 3/002 |

* cited by examiner

*Primary Examiner* — Bryan A Evans
(74) *Attorney, Agent, or Firm* — Seyfarth Shaw LLP (57) ABSTRACT

The present disclosure relates to a running board and a vehicle comprising the same. The running board includes an intermediate connector, a first running board body, and the second running board body. The intermediate connector includes a first rotating shaft, a second rotating shaft, a first mounting member, and a second mounting member. The first rotating shaft is connected to the second rotating shaft. The first rotating shaft is inserted into the first mounting member, and the first mounting member rotates about the first rotating shaft. The second rotating shaft is inserted into the second mounting member, and the second mounting member rotates about the second rotating shaft. The first running board body and the second running board body are foldable side-to-side through the intermediate connector.

9 Claims, 5 Drawing Sheets

RUNNING BOARDS AND VEHICLES

CROSS-REFERENCE TO RELATED APPLICATION

This application claims the benefit of Chinese Patent Application No. 2020102493812, filed on Apr. 1, 2020, the entire content of which is incorporated herein in its entirety.

TECHNICAL FIELD

The present disclosure relates to the technical field of vehicles, in particular, to a running board and a vehicle.

BACKGROUND

Running boards are vehicle accessories mounted on sides of a vehicle. Since the chassis of the vehicle such as pick-up and sport utility vehicle (SUV) is generally higher than ground, it is inconvenient for users to board the vehicle. The running boards are mainly used in pick-ups and SUVs, and function as creating a boarding step for users, to help users get on and off smoothly. At the same time, the running boards can protect the side skirt of the vehicle from direct collision in daily use, thereby protecting the vehicle body.

At present, the body of the general running boards is generally a rigid piece made of a single material or multiple materials, with an anti-corrosion additionally sprayed on the surface thereof, which is now a conventional product in various auto aftermarket of running boards. However, such products need more packaging materials and occupy more transporting space during the packaging and transporting process, which increases transporting costs and packaging costs.

SUMMARY

According to various embodiments of the present disclosure, a running board and a vehicle including the same are provided.

A running board is provided, which includes:

an intermediate connector including a first rotating shaft, a second rotating shaft, a first mounting member, and a second mounting member, wherein an axis direction of the first rotating shaft is parallel to an axis direction of the second rotating shaft, the first rotating shaft is connected to the second rotating shaft, the first rotating shaft is inserted into the first mounting member, the first mounting member rotates about the first rotating shaft, the second rotating shaft is inserted into the second mounting member, and the second mounting member rotates about the second rotating shaft;

a first running board body and a second running board body, wherein an end of the first running board body is connected to an end of the first mounting member away from the first rotating shaft, an end of the second running board body is connected to an end of the second mounting member away from the second rotating shaft, the first running board body and the second running board body are foldable side-to-side through the intermediate connector.

A vehicle including the aforementioned running board is also provided.

The above and other features of the present disclosure including various novel details of construction and combinations of parts, and other advantages, will now be more particularly described with reference to the accompanying drawings and pointed out in the claims.

BRIEF DESCRIPTION OF THE DRAWINGS

The drawings forming a part of this disclosure are used to provide a further understanding of the present disclosure. Schematic embodiments and descriptions thereof in the present disclosure are used to explain the present disclosure and do not form an undue limitation on the present disclosure.

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

In order to make the above objects, features and advantages of the present disclosure more obvious and understandable, the specific embodiments of the present disclosure will be illustrated in detail below in conjunctions with the accompanying drawings. In the following description, many specific details are set forth in order to assist readers in fully understanding the present disclosure. However, the present disclosure can be implemented in many other ways than described herein, and those skilled in the art can make similar improvements without departing from the connotation of the present disclosure. Therefore, the present disclosure is not limited by the specific embodiments disclosed below.

In the description of the present disclosure, it should be understood that orientation or positional relationships indicated by terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are based on orientation or positional relationship shown in the drawings, which are merely to facilitate the description of the present disclosure and simplify the description, not to indicate or imply that the device or elements must have a particular orientation, be constructed and operated in a particular orientation, and therefore cannot be construed as a limitation on the present disclosure.

In addition, the terms "first" and "second" are used for description only, and cannot be understood as indicating or implying relative importance or implicitly indicating the number of technical features described. Thus, the features defined with "first" and "second" may include at least one of the features explicitly or implicitly. In the description of the present disclosure, the meaning of "plurality" is at least two, such as two, three, etc., unless explicitly defined otherwise.

In the present disclosure, unless explicitly specified and limited otherwise, the terms "mounting", "connecting", "connected", "fixed" and the like should be understood in a broad sense. For example, it may be a fixed connection or a detachable connection, or an integration, may be a mechanical connection or electrical connection, may be a direct connection, or may be an indirect connection through an intermediate medium, may be the connection between two elements or the interaction relationship between two elements, unless explicitly defined otherwise. The specific meanings of the above terms in the present disclosure can be understood by one of those ordinary skills in the art according to specific circumstances.

In the present disclosure, unless explicitly specified and limited otherwise, the first feature being "on" or "below" the second feature may be that the first and second features are in a direct contact, or the first and second features are in an indirectly contact through an intermediate medium. Moreover, the first feature being "over", "above" and "on" the second feature may be that the first feature is directly above or obliquely above the second feature, or simply means that the first feature is higher than the second feature in horizontal direction. The first feature being "beneath", "under", and "below" the second feature may be that the first feature is directly below or obliquely below the second feature, or simply means that the first feature is lower than the second feature in horizontal direction.

It should be noted that when an element is referred to as being "fixed" or "disposed on" another element, it may be directly on another element or there may also be an intermediate element therebetween. When an element is considered to be "connected" to another element, it may be directly connected to another element or there may be an intermediate element therebetween. As used herein, the terms "vertical", "horizontal", "upper", "lower", "left", "right", and similar expressions are for illustration only and are not meant to be the only embodiments.

In one aspect of the present disclosure, a running board 100 is provided, which can include, but is not limited to, an intermediate connector 110, a first running board body 120, and the second running board body 130. The intermediate connector 110 includes a first rotating shaft 111, a second rotating shaft 112, a first mounting member 113, and a second mounting member 114. An axis direction of the first rotating shaft 111 is parallel to an axis direction of the second rotating shaft 112. The first rotating shaft 111 is connected to the second rotating shaft 112. The first rotating shaft 111 is inserted into the first mounting member 113, and the first mounting member 113 rotates about the first rotating shaft 111. The second rotating shaft 112 is inserted into the second mounting member 114, and the second mounting member 114 rotates about the second rotating shaft 112. An end of the first running board body 120 is connected to an end of the first mounting member 113 away from the first rotating shaft 111. An end of the second running board body 130 is connected to an end of the second mounting member 114 away from the second rotating shaft 112. The first running board body 120 and the second running board body 130 are foldable side-to-side through the intermediate connector 110.

In one of the embodiments, the first mounting member 113 is provided with a first through hole 1132 at an end thereof, the first rotating shaft 111 is inserted into the first through hole 1132. The second mounting member 114 is provided with a second through hole 1142 at an end thereof, the second rotating shaft 112 is inserted into the second through hole 1142.

In one of the embodiments, the first mounting member 113 includes two first protruding portions 1131 spaced apart from each other. Each of the two first protruding portions 1131 is provided with the first through hole 1132. The first rotating shaft 111 is accommodated between the two first protruding portions 1131, and both ends of the first rotating shaft 111 are inserted into the first through holes 1132 of the two first protruding portions 1131, respectively. The second mounting member 114 includes two second protruding portions 1141 spaced apart from each other. Each of the two second protruding portions 1141 is provided with the second through hole 1142. The second rotating shaft 112 is accommodated between the two second protruding portions 1141, and both ends of the second rotating shaft 112 are inserted into the second through holes 1142 of the two second protruding portions 1141, respectively.

In one of the embodiments, the intermediate connector 110 further includes a rotating shaft connector 115. The rotating shaft connector 115 is provided with a third through hole (not shown) and a fourth through hole (not shown). The third through hole and the fourth through hole are provided in parallel. The first rotating shaft 111 passes through the third through hole. Both ends of the first rotating shaft 111 extend out of the third through hole and are inserted into the first through holes 1132. The second rotating shaft 112 passes through the fourth through hole. Both ends of the second rotating shaft 112 extend out of the fourth through hole and are inserted into the second through holes 1142.

In one of the embodiments, the first mounting member 113 includes a first contacting flat surface 1133 and a first contacting arc surface 1134 abutting the first contacting flat surface 1133. The second mounting member 114 includes a second contacting flat surface 1143 and a second contacting arc surface 1144 abutting the second contacting flat surface 1143. When the first running board body 120 and the second running board body 130 are in a linearly unfolded state, the first contacting flat surface 1133 is attached to the second contacting flat surface 1143. When the first running board body 120 and the second running board body 130 are in a folded state, the first contacting arc surface 1134 is in contact with the second contacting arc surface 1144.

In one of the embodiments, the running board 100 further includes an intermediate cover 140 covering a connection portion between the first running board body 120 and the second running board body 130.

In one of the embodiments, each of the first running board body 120 and the second running board body 130 is provided with a tapped hole 121. Each of the first mounting member 113 and the second mounting member 114 is provided with a self-tapping screw 116. The self-tapping screw 116 is engaged with the tapped hole 121.

In one of the embodiments, the running board 100 further includes end heads 150 disposed on an end of the first running board body 120 away from the intermediate connector 110 and disposed on an end of the second running board body 130 away from the intermediate connector 110.

In one of the embodiments, the running board 100 further includes an anti-skid structure (not shown) disposed on surfaces of the first running board body 120 and the second running board body 130.

In another aspect of the present disclosure, a vehicle including the running board 100 as described in any one of the aforementioned embodiments is provided.

The present embodiment provides a running board 100 and a vehicle, which have the advantages of convenient folding, reduced transporting costs and packaging costs, and saved space for placement, and which will be described in detail below with reference to the accompanying drawings.

Figure 1:
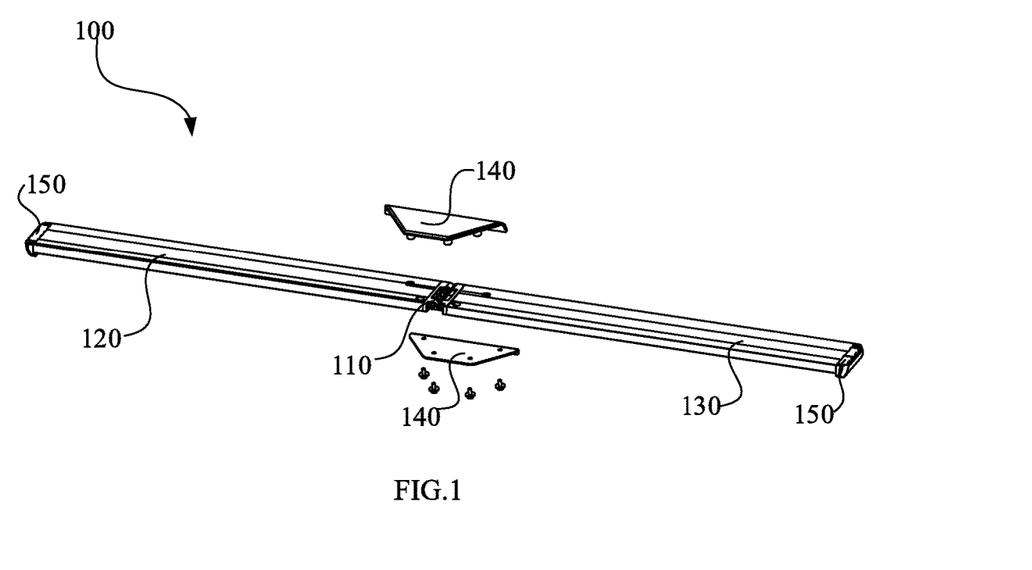
FIG. 1 is a schematic view of a running board in a linearly unfolded state according to an embodiment of the present disclosure.
Figure 2:
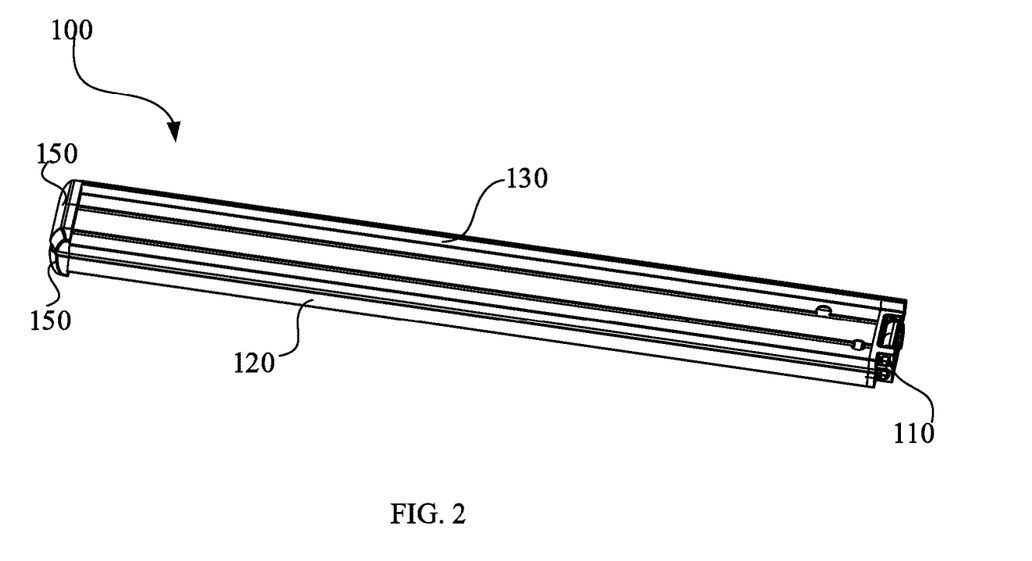
FIG. 2 is a schematic view of a running board in a folded state according to an embodiment of the present disclosure.
Figure 3:
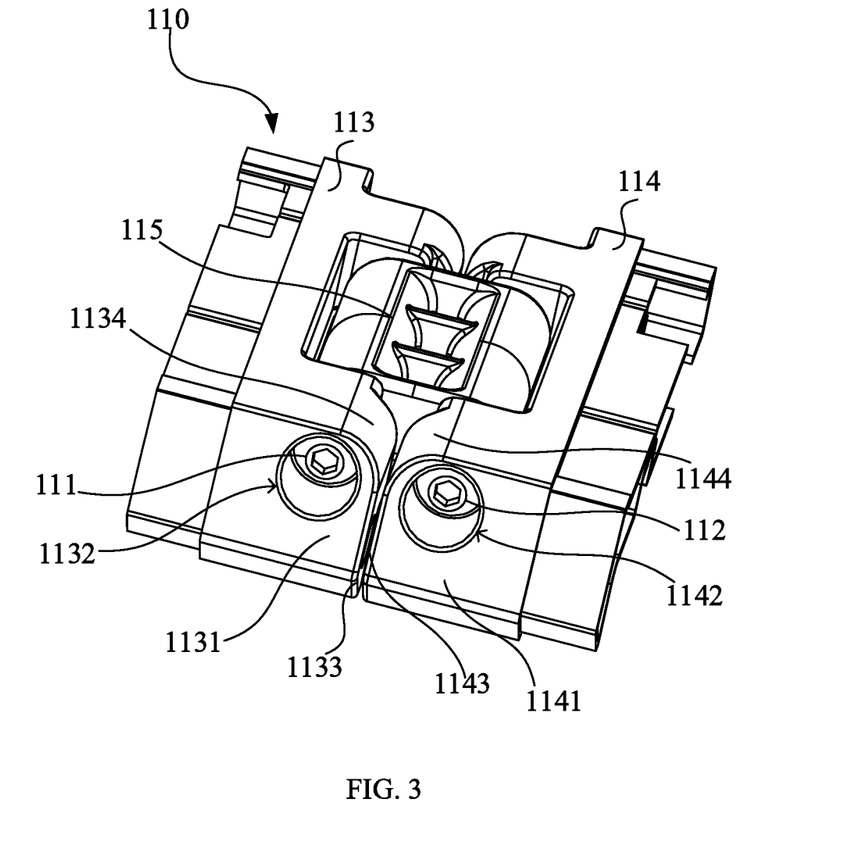
FIG. 3 is a schematic view of an intermediate connector of a running board according to an embodiment of the present disclosure.

In one embodiment, referring to FIGS. 1 to 3, a running board 100 includes an intermediate connector 110, a first running board body 120, and a second running board body 130. The intermediate connector 110 includes a first rotating shaft 111, a second rotating shaft 112, a first mounting member 113, and a second mounting member 114. An axis direction of the first rotating shaft 111 is parallel to an axis direction of the second rotating shaft 112. The first rotating shaft 111 is connected to the second rotating shaft 112. The first rotating shaft 111 is inserted into the first mounting member 113, and the first mounting member 113 rotates about the first rotating shaft 111. The second rotating shaft 112 is inserted into the second mounting member 114, and the second mounting member 114 rotates about the second rotating shaft 112. An end of the first running board body 120 is connected to an end of the first mounting member 113 away from the first rotating shaft 111. An end of the second running board body 130 is connected to an end of the second mounting member 114 away from the second rotating shaft 112. The first running board body 120 and the second running board body 130 are foldable side-to-side through the intermediate connector 110.

The running board 100 according to the present embodiment includes the intermediate connector 110, the first running board body 120, and the second running board body 130. The first running board body 120 is connected to the first mounting member 113, the first rotating shaft 111 is inserted in the first mounting member 113, and the first mounting member 113 rotates about the first rotating shaft 111, that is, the first running board body 120 may rotate with first mounting member 113 about the first rotating shaft 111. In a similar way, the second running board body 130 is connected to the second mounting member 114, the second rotating shaft 112 is inserted in the second mounting member 114, and the second mounting member 114 rotates about the second rotating shaft 112, that is, the second running board body 130 may rotate with the second mounting member 114 about the second rotating shaft 112. In this way, the first running board body 120 and the second running board body 130 may rotate to a position where the two running board bodies are folded side-to-side. Through the above configuration, the running board 100 according to the present disclosure has a flexible and variable structure. During the transporting process, the running board may be turned and folded to reduce the overall volume, so that the transporting costs and the packaging costs are saved, and the space for placement can be saved.

Figure 5:
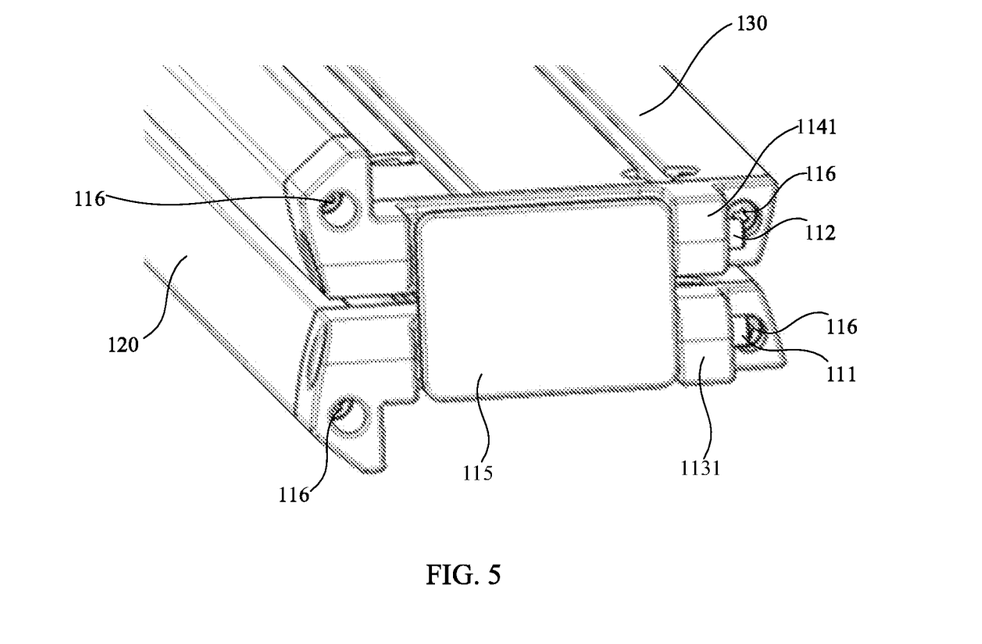
FIG. 5 is a schematic view of an end of a running board in a folded state according to an embodiment of the present disclosure.

In one embodiment, referring to FIGS. 3 and 5, the first mounting member 113 is provided with a first through hole 1132 at an end thereof. The first rotating shaft 111 is inserted into the first through hole 1132. The second mounting member 114 is provided with a second through hole 1142 at an end thereof. The second rotating shaft 112 is inserted into the second through hole 1142. Specifically, the first mounting member 113 includes two first protruding portions 1131 spaced apart from each other. Each of the two first protruding portions 1131 is provided with the first through hole 1132. The first rotating shaft 111 is accommodated between the two first protruding portions 1131, and both ends of the first rotating shaft 111 are inserted into the first through holes 1132 of the two first protruding portions 1131, respectively. The second mounting member 114 includes two second protruding portions 1141 spaced apart from each other. Each of the two second protruding portions 1141 is provided with the second through hole 1142. The second rotating shaft 112 is accommodated between the two second protruding portions 1141, and both ends of the second rotating shaft 112 are inserted into the second through holes 1142 of the two second protruding portions 1141, respectively. In this way, the first rotating shaft 111 can be mounted on the first mounting member 113, and the second rotating shaft 112 can be mounted on the second mounting member 114. Moreover, the first mounting member 113 can also rotate about the first rotating shaft 111, and the second mounting member 114 can also rotate about the second rotating shaft 112. In other words, the first mounting member 113 and the second mounting member 114 drive the first running board body 120 and the second running board body 130 to rotate, respectively, causing that the first running board body 120 may rotate by a certain angle relative to the second running board body 130, for example, the first running board body 120 and the second running board body 130 may rotate to a position where they are folded side-to-side.

In one embodiment, referring to FIGS. 3 and 5, the intermediate connector 110 further includes a rotating shaft connector 115. The rotating shaft connector 115 is provided with a third through hole (not shown) and a fourth through hole (not shown). The third through hole and the fourth through hole are provided in parallel. The first rotating shaft 111 passes through the third through hole. Both ends of the first rotating shaft 111 extend out of the third through hole and are inserted into the first through holes 1132. The second rotating shaft 112 passes through the fourth through hole. Both ends of the second rotating shaft 112 extend out of the fourth through hole and are inserted into the second through holes 1142. Specifically, the rotating shaft connector 115 has a rectangular block structure. The rectangular block structure is provided with the third through hole and the fourth through hole at both sides thereof, respectively. The middle portion of the first rotating shaft 111 is sleeved in the third through hole, and both ends of the first rotating shaft 111 extend out of the third through hole and are inserted into the first through holes 1132 of the first protruding portions 1131. If the first rotating shaft 111 is provided in the third through hole with an interference fit, that is, the first rotating shaft 111 is provided in the third through hole in a state of being unable to rotate, it is only necessary that the first rotating shaft 111 has a certain clearance in the first through hole 1132 to ensure that the first mounting member 113 can rotate about the end of the first rotating shaft 111, so that the rotation motion of the first mounting member 113 about the first rotating shaft 111 can be realized. If the first rotating shaft 111 is provided in the first through hole 1132 with an interference fit, that is, the first mounting member 113 cannot rotate relative to the end of the first rotating shaft 111, it is only necessary that the first rotating shaft 111 has a certain clearance in the third through hole, so that the first rotating shaft 111 can rotate about its own axis in the third through hole, and the first mounting member 113 may rotate along with the rotation of the first rotating shaft 111. The configuration of the second rotating shaft 112 is the same as or similar to that of the first rotating shaft 111, and will not be described herein.

In one embodiment, referring to FIGS. 1 to 3, the first mounting member 113 includes a first contacting flat surface 1133 and a first contacting arc surface 1134 abutting the first contacting flat surface 1133. The second mounting member 114 includes a second contacting flat surface 1143 and a second contacting arc surface 1144 abutting the second contacting flat surface 1143. When the first running board body 120 and the second running board body 130 are in a linearly unfolded state, the first contacting flat surface 1133 is attached to the second contacting flat surface 1143. When the first running board body 120 and the second running board body 130 are in a folded state, the first contacting arc surface 1134 is in contact with the second contacting arc surface 1144. The linearly unfolded state refers to a state in which the running board body 120 and the second running board body 130 are unfolded into a straight line and can be mounted on the vehicle body. The folded state refers to a state in which the first running board body 120 and the second running board body 130 are folded together side-to-side, at which time packaging and transporting can be performed. Specifically, the first protruding portion 1131 and the second protruding portion 1141 have a rectangular block structure. When the first running board body 120 and the second running board body 130 are in the linearly unfolded state, the first contacting flat surface 1133 of the first protruding portion 1131 is attached to the second contacting flat surface 1143 of the second protruding portion 1141. When the first running board body 120 and the second running board body 130 need to be folded, it is only necessary to hold the first running board body 120 and the second running board body 130 to rotate them by 90°, respectively, and thus the first running board body 120 and the second running board body 130 can be folded together side-to-side. During the folding process, the first contacting arc surface 1134 of the first protruding portion 1131 is in contact with the second contacting arc surface 1144 of the of the second protruding portion 1141, which facilitates the rotation of the first running board body 120 and the second running board body 130, and avoids an interference phenomenon during the rotation.

In one embodiment, referring to FIG. 1, the running board 100 further includes an intermediate cover 140 covering a connection portion between the first running board body 120 and the second running board body 130. Specifically, the intermediate cover 140 may be fixed at the connection portion between the first running board body 120 and the second running board body 130 by bonding, screwing, engaging and the like. When the running board 100 is mounted on the vehicle body, the intermediate cover 140 is mounted on the running board 100 to hide the intermediate connector 110, which is also beneficial to protect the intermediate connector 110.

Figure 4:
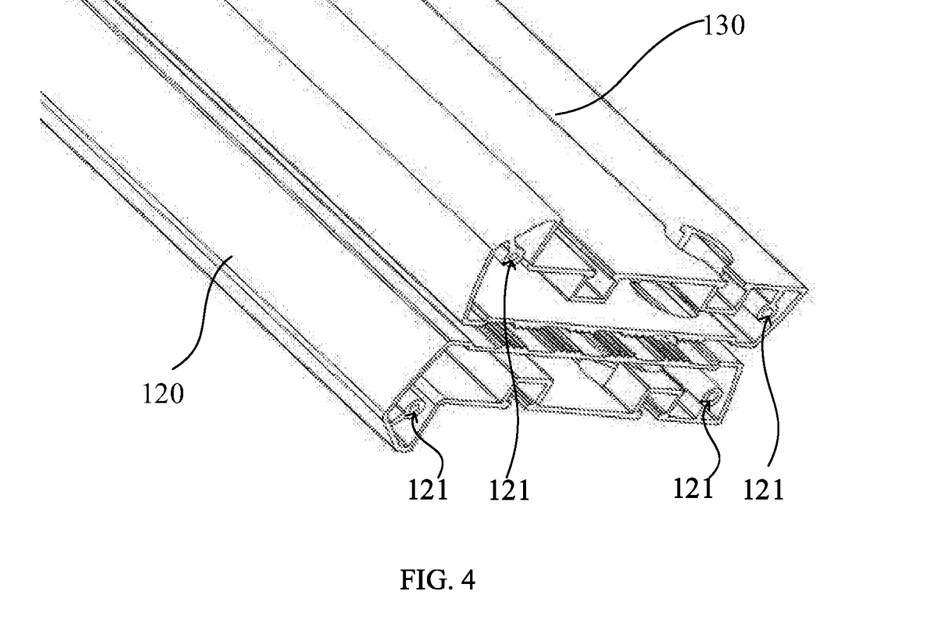
FIG. 4 is a schematic view of ends of a first running board body and a second running board body according to an embodiment of the present disclosure.

In one embodiment, referring to FIGS. 3 to 5, each of the first running board body 120 and the second running board body 130 is provided with a tapped hole 121. Each of the first mounting member 113 and the second mounting member 114 is provided with a self-tapping screw 116. The self-tapping screws 116 are engaged with the tapped holes 121. Specifically, the end of the first running board body 120 for connecting to the first mounting member 113 is provided with a tapped hole 121, and the end of the second running board body 130 for connecting to the second mounting member 114 is also provided with a tapped hole 121. During the process of mounting the first running board body 120 on the first mounting member 113, the self-tapping screws 116 on the first mounting member 113 are only needed to be screwed into the tapped holes 121 at the end of the first running board body 120. Similarly, the second mounting member 114 and the second running board body 130 are connected in the same way as the first mounting member 113 and the first running board body 120, and will not be described herein. It can be understood that the first mounting member 113 and the first running board body 120 can be connected to each other by means of engagement, in addition to the use of the self-tapping screws 116, which is not particularly limited hereto.

In one embodiment, referring to FIGS. 1 to 2, the running board 100 further includes end heads 150. The end head 150 is disposed on the end of the first running board body 120 away from the intermediate connector 110, and is also disposed on the end of the second running board body 130 away from the intermediate connector 110. Specifically, the end heads 150 are made of plastics, and the first running board body 120 and the second running board body 130 are made of aluminum. The end heads 150 can protect the ends of the first running board body 120 and the second running board body 130 from abrasion and affecting the appearance.

In one embodiment, referring to FIG. 1, the running board 100 further includes an anti-skid structure (not shown). The anti-skid structure is disposed on surfaces of the first running board body 120 and the second running board body 130. The anti-skid structure is provided on a stepping area of the running board 100. The anti-skid structure may have a surface spray coating, such as a sand blasting grain powder or a coating with a rough feeling and increased friction, so that the stepping area of the running board 100 has an anti-skid function, and the safety is improved.

It can be understood that the running board 100 may include three or four running board bodies, other than the first running board body 120 and the second running board body 130, which is not particularly limited hereto.

Figure 6:
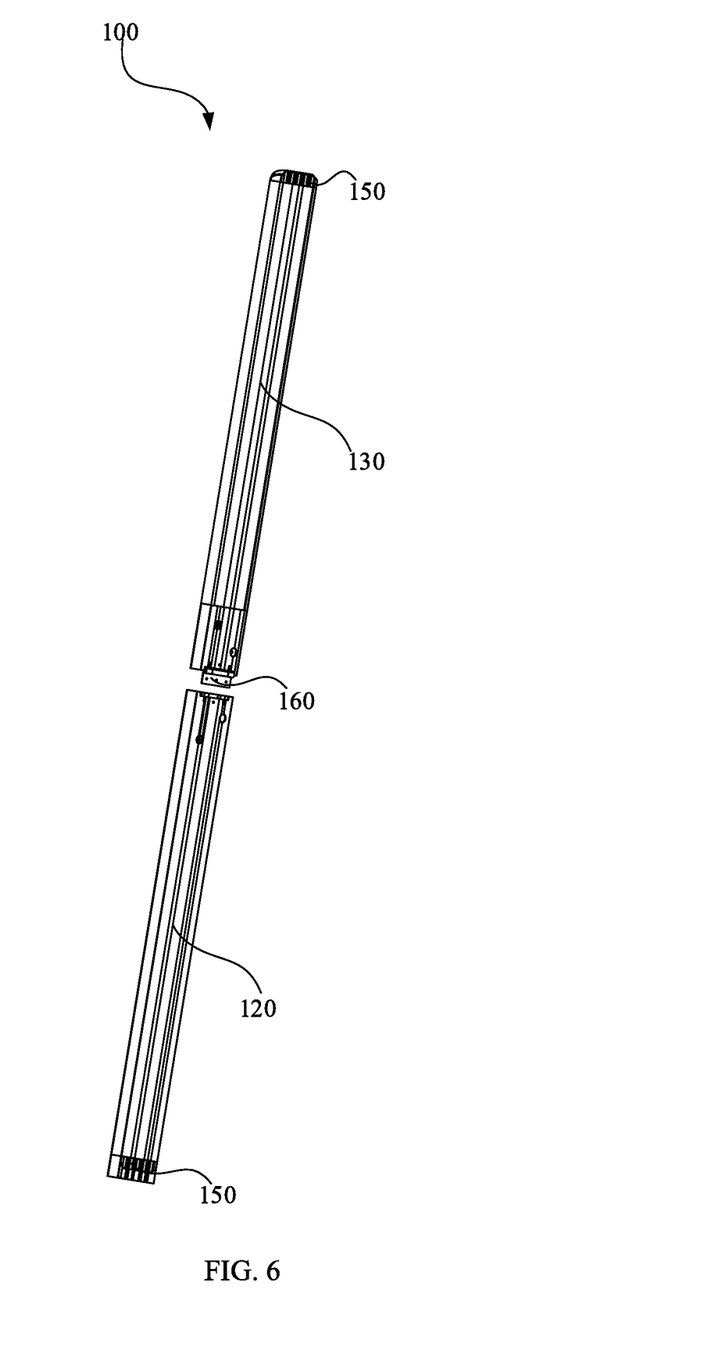
FIG. 6 is a schematic view of a running board with a hinge structure according to an embodiment of the present disclosure.

As shown in FIG. 6, other than the intermediate connector 110 as described in the above embodiment, the first running board body 120 and the second running board body 130 may be connected to each other by a hinge structure 160. Empty slots are provided in the first running board body 120 and the second running board body 130 in advance. Two leaves of the hinge structure 160 are mounted in the empty slot of the first running board body 120 and the empty slot of the second running board body 130 by screws, respectively, so that the hinge structure 160 can be hidden, and the first running board body 120 and the second running board body 130 can rotate relative to each other to be folded together.

Figure 7:
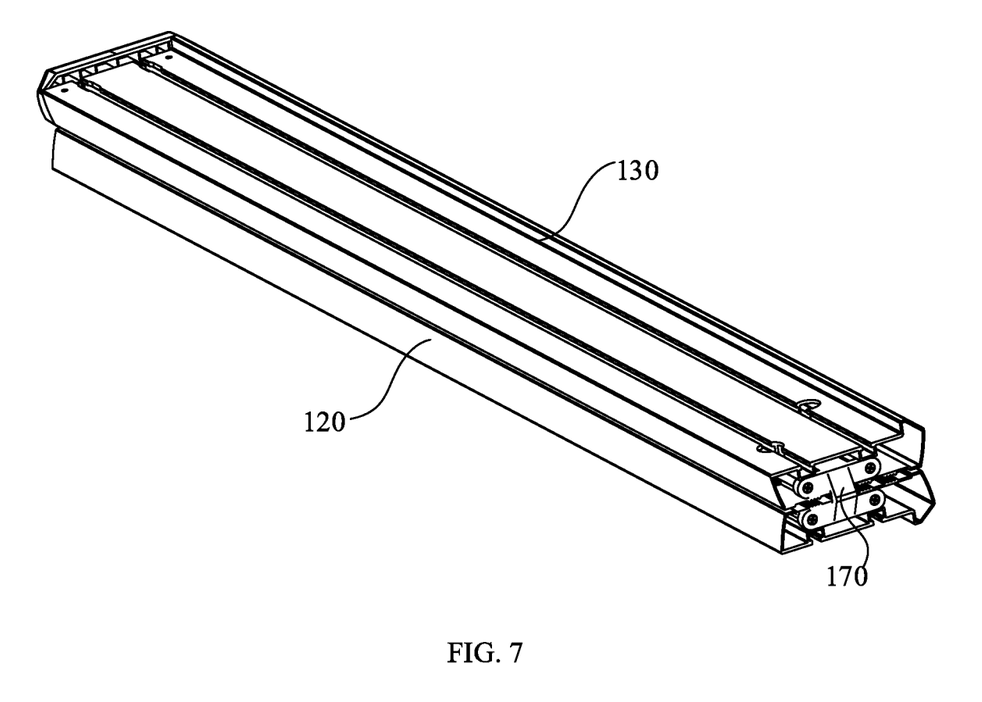
FIG. 7 is a schematic view of a running board with a multi-axis hinge structure according to an embodiment of the present disclosure.

As shown in FIG. 7, the first running board body 120 and the second running board body 130 may also be connected to each other by a multi-axis hinge structure 170, and the multi-axis hinge structure 170 is a common connecting structure in the art and thus will not be described herein.

In one embodiment, referring to FIG. 1, a vehicle includes the running board 100 as described in any one of the above described embodiments. Since the vehicle includes the running board 100 as described above, the technical effects brought by the running board 100 also apply to the vehicle including the running board 100, and thus will not be described herein.

The running board 100 according to the present embodiments includes the intermediate connector 110, the first running board body 120, and the second running board body 130. The first running board body 120 is connected to the first mounting member 113, the first rotating shaft 111 is inserted in the first mounting member 113, and the first mounting member 113 rotates about the first rotating shaft 111, that is, the first running board body 120 may rotate with first mounting member 113 about the first rotating shaft 111. In a similar way, the second running board body 130 is connected to the second mounting member 114, the second rotating shaft 112 is inserted in the second mounting member 114, and the second mounting member 114 rotates about the second rotating shaft 112, that is, the second running board body 130 may rotate with the second mounting member 114 about the second rotating shaft 112. In this way, the first running board body 120 and the second running board body 130 may rotate to a position where two running board bodies are folded side-to-side. Through the above configuration, the running board 100 according to the present disclosure has a flexible and variable structure. During the transporting process, the running board may be turned and folded to reduce the overall volume, so that the transporting costs and the packaging costs are saved, and the space for placement can be saved.

The technical features of the embodiments described above can be arbitrarily combined. In order to make the description succinct, there is no describing of all possible combinations of the various technical features in the foregoing embodiments. It should be noted that there is no contradiction in the combination of these technical features which should be considered as the scope of the description.

Although the present disclosure is illustrated and described herein with reference to specific embodiments, the present disclosure is not intended to be limited to the details shown. It is to be noted that, various modifications may be made in the details within the scope and range of equivalents of the claims and without departing from the present disclosure. Therefore, the protection scope of the present disclosure shall be subject to the protection scope of the claims.

What is claimed is:

1. A running board, comprising:
   an intermediate connector comprising a first rotating shaft, a second rotating shaft, a first mounting member, and a second mounting member, wherein an axial direction of the first rotating shaft is parallel to an axial direction of the second rotating shaft, the first rotating shaft is connected to the second rotating shaft, the first rotating shaft is inserted into the first mounting member, the first mounting member rotates about the first rotating shaft, the second rotating shaft is inserted into the second mounting member, and the second mounting member rotates about the second rotating shaft;
   a first running board body and a second running board body, wherein an end of the first running board body is connected to an end of the first mounting member away from the first rotating shaft, an end of the second running board body is connected to an end of the second mounting member away from the second rotating shaft, the first running board body and the second running board body are foldable side-to-side through the intermediate connector;
   wherein the first mounting member comprises a first contacting flat surface and a first contacting arc surface abutting the first contacting flat surface, and the second mounting member comprises a second contacting flat surface and a second contacting arc surface abutting the second contacting flat surface, and
   wherein when the first and second running board bodies are in a substantially linearly unfolded state, the first contacting flat surface is attached to the second contacting flat surface, and
   when the first and second running board bodies are in a substantially folded state, the first contacting arc surface is in contact with the second contacting arc surface.

2. The running board according to claim 1, wherein the first mounting member is provided with a first through hole at an end thereof, the first rotating shaft is inserted into the first through hole, and the second mounting member is provided with a second through hole at an end thereof, the second rotating shaft is inserted into the second through hole.

3. The running board according to claim 2, wherein the first mounting member comprises two first protruding portions spaced apart from each other, each of the two first protruding portions being provided with the first through hole,
   the first rotating shaft is accommodated between the two first protruding portions, and both ends of the first rotating shaft are inserted into the first through holes of the two first protruding portions, respectively;
   the second mounting member comprises two second protruding portions spaced apart from each other, each of the two second protruding portions being provided with the second through hole,
   the second rotating shaft is accommodated between the two second protruding portions, and both ends of the second rotating shaft are inserted into the second through holes of the two second protruding portions, respectively.

4. The running board according to claim 2, wherein the intermediate connector further comprises a rotating shaft connector, the rotating shaft connector being provided with a third through hole and a fourth through hole, the third through hole and the fourth through hole being provided in parallel,
   the first rotating shaft passes through the third through hole, both ends of the first rotating shaft extend out of the third through hole and are inserted into the first through holes,
   the second rotating shaft passes through the fourth through hole, both ends of the second rotating shaft extend out of the fourth through hole and are inserted into the second through holes.

5. The running board according to claim 1, further comprising an intermediate cover covering a connection portion between the first running board body and the second running board body.

6. The running board according to claim 1, wherein each of the first running board body and the second running board body is provided with a tapped hole, each of the first mounting member and the second mounting member is provided with a self-tapping screw, the self-tapping screw is engaged with the tapped hole.

7. The running board according to claim 1, further comprising end heads disposed on an end of the first running board body away from the intermediate connector and disposed on an end of the second running board body away from the intermediate connector.

8. The running board according to claim 1, further comprising an anti-skid structure disposed on surfaces of the first running board body and the second running board body.

9. A vehicle comprising a running board, wherein the running board comprises:
   an intermediate connector comprising a first rotating shaft, a second rotating shaft, a first mounting member, and a second mounting member, wherein an axial direction of the first rotating shaft is parallel to an axial direction of the second rotating shaft, the first rotating shaft is connected to the second rotating shaft, the first rotating shaft is inserted into the first mounting member, the first mounting member rotates about the first rotating shaft, the second rotating shaft is inserted into the second mounting member, and the second mounting member rotates about the second rotating shaft;

a first running board body and a second running board body, wherein an end of the first running board body is connected to an end of the first mounting member away from the first rotating shaft, an end of the second running board body is connected to an end of the second mounting member away from the second rotating shaft, the first running board body and the second running board body are foldable side-to-side through the intermediate connector;

wherein the first mounting member comprises a first contacting flat surface and a first contacting arc surface abutting the first contacting flat surface, and the second mounting member comprises a second contacting flat surface and a second contacting arc surface abutting the second contacting flat surface, and wherein when the first and second running board bodies are in a substantially linearly unfolded state, the first contacting flat surface is attached to the second contacting flat surface, and when the first and second running board bodies are in a substantially folded state, the first contacting arc surface is in contact with the second contacting arc surface.

* * * * *

UNITED STATES PATENT AND TRADEMARK OFFICE
CERTIFICATE OF CORRECTION

| | | |
|---|---|---|
| PATENT NO. | : 11,420,563 B2 | Page 1 of 1 |
| APPLICATION NO. | : 16/930610 | |
| DATED | : August 23, 2022 | |
| INVENTOR(S) | : Guodong Luo, Changbiao Chen and Jie Yang | |

It is certified that error appears in the above-identified patent and that said Letters Patent is hereby corrected as shown below:

On the Title Page

After the Prior Publication Data, insert the following foreign priority information:
--(30) Foreign Application Priority Data
Apr. 1, 2020 (CN) ............................. 202010249381.2--

Signed and Sealed this
Twenty-sixth Day of September, 2023

Katherine Kelly Vidal
*Director of the United States Patent and Trademark Office*